United States Patent Office 3,544,898
Patented Dec. 1, 1970

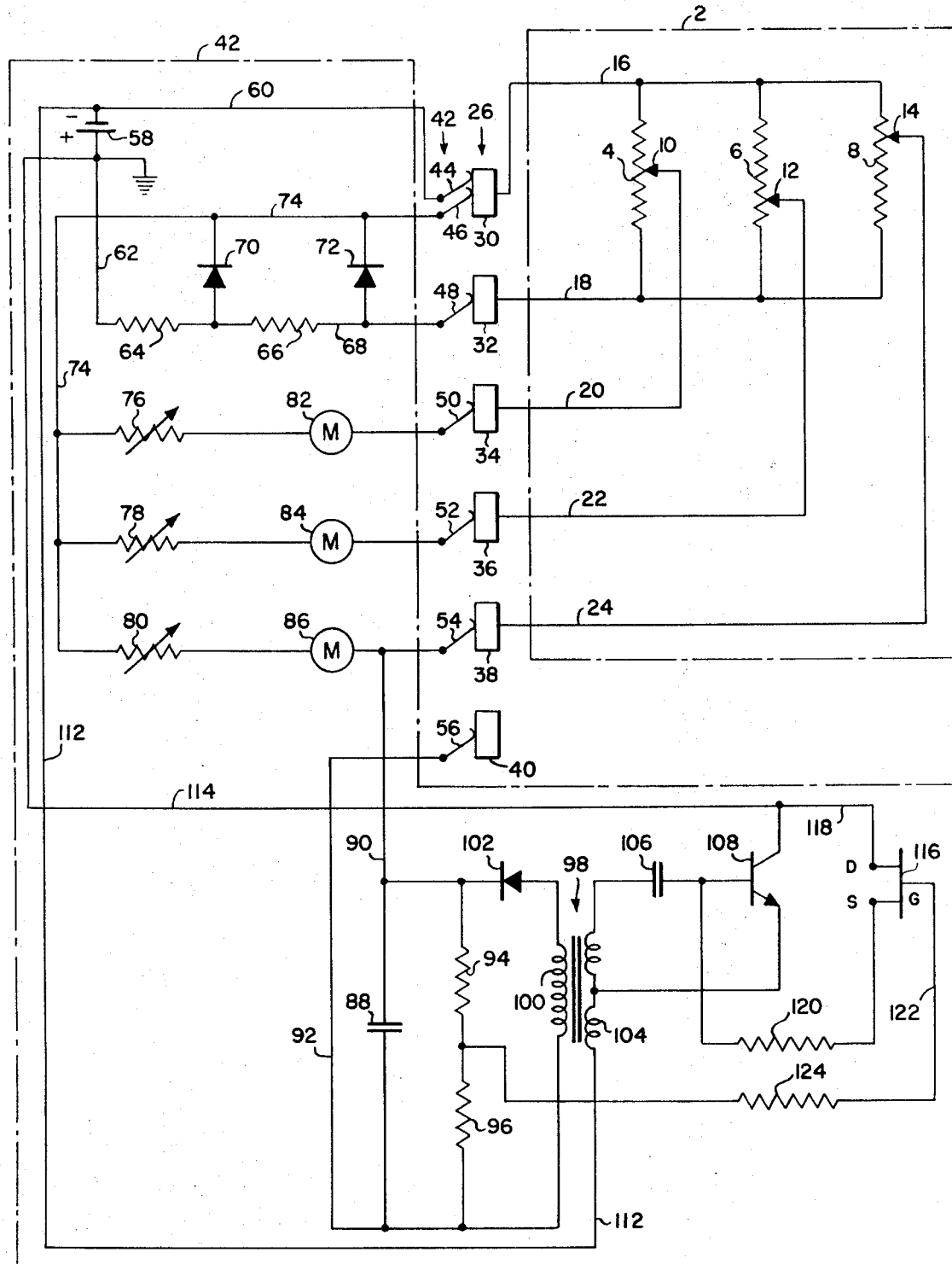

3,544,898
CONTROL CIRCUIT FOR MAINTAINING A CHARGE IN A CAPACITOR
William D. Macgeorge, Doylestown, Pa., assignor to American Meter Company, Philadelphia, Pa., a corporation of Delaware
Filed Sept. 18, 1967, Ser. No. 668,428
Int. Cl. H02j 7/24; H03k 17/60
U.S. Cl. 324—157                         5 Claims

ABSTRACT OF THE DISCLOSURE

An oscillator powered by a battery charges a capacitor to a voltage exceeding that of the battery. To prevent battery drain, a field effect transistor responds to the capacitor potential to cut off current to the oscillator when the capacitor attains a predetermined voltage. The capacitor is used in a meter reading circuit to provide a current flow to clean engageable contacts to avoid undue resistance to currents supplied by the low voltage battery.

BACKGROUND OF THE INVENTION

The invention relates to the charging of capacitors by the use of oscillators powered by low voltage sources, the oscillators producing outputs of higher voltages through step-up transformers to charge capacitors through rectifiers. Heretofore such oscillators have operated continuously through entire periods of manual switching to "On" conditions. Excessive drains on battery supplies result. This is particularly objectionable when the apparatus involved is to be handled by unskilled persons likely to pay no attention to manual switching. For example, there have come into use reading devices for utility meters measuring electrical usage, water supplies and gas supplies in which the meters control and variably position potentiometers having connections to a plug or socket available from the exterior of a building. A meter reader carries a box containing a small battery and one or more electrical meters and provided with a connecting device cooperating with the plug or socket. When connection is made these meters read the potential outputs of the potentiometer or potentiometers. The contact elements at the building are subject to corrosion, and the connections may involve sufficient resistances to affect appreciably the meter readings. To clean the contacts, arrangements have been provided to charge a capacitor to a relatively high voltage, with connections so made that as the contacts are brought into position wiping actions will occur with discharges of the capacitor to break through points of corrosion. When this is done the corrosion is quite effectively removed to reduce resistances so that flow of current from a low voltage battery source may occur properly to produce accurate meter readings.

Charging of such a capacitor from a low voltage source is most effectively achieved by causing the source to energize a transistor oscillator, the output of which is fed through a transformer and rectifier to charge the capacitor. While an oscillator of this type has a low current drain, continuous operation of the oscillator lowers very appreciably the life of the battery. Considering the unskilled nature of the meter readers, it is desirable to have the reading device operate without any special manipulations except what is involved in making the plug and socket connections. Both hands of the reader are usually employed in entering readings on a chart so that even the use of a switching arrangement is undesirable.

SUMMARY OF THE INVENTION

In accordance with the invention, the oscillator operates only when the capacitor has less than its proper charge. This result is achieved by controlling supply current to the oscillator through a field effect transistor, the gate of which is connected through a high resistance network across the capacitor. The gate of a field effect transistor has a very high input impedance drawing very little current from the capacitor so that, in view of the very low leakage the capacitor will effectively maintain its charge through extended periods, the oscillator operating only at well-spaced intervals, with its individual operations of short duration which may typically be of the order of one second. While the invention is of more general applicability, it will be described in its setting in a meter reader device of the type indicated, the arrangement specifically involving the cleaning of multiple contacts.

BRIEF DESCRIPTION OF THE DRAWING

The single figure is a schematic diagram of the electrical system involved.

DESCRIPTION OF THE PREFERRED EMBODIMENT

Within a building or locally associated with a meter are the elements diagrammed in the box indicated at 2. The arrangement therein is conventional and involves the potentiometers 4, 6 and 8 having the movable contacts 10, 12 and 14 respectively moved by the multiple output spindles of a meter, the potentiometers being circular in form so that the movements of the contacts are cyclic. For example, in the case of a gas meter the cycles of the contacts may be proportional to decimal multiples of some basic measurement in cubic feet, the spindles at the meter generally driving pointers moving circularly about dials which may be visually read at the meter but which are not accessible to a meter reader unless he gains access to the building housing the meter. For remote reading, wires 16, 18, 20, 22 and 24 run to contacts of a group indicated at 26 which may be provided as rings on a plug in or on the exterior wall of a building, the ring contacts being respectively indicated at 30, 32, 34, 36 and 38, there being also shown an unconnected ring at 40 which may be omitted if desired. The contact 30 is connected to the common line 16 and the contact 32 is connected to the comon line 18, the potentiometers 4, 6 and 8 being connected between these lines. The contacts 34, 36 and 38 are respectively connected to the potentiometer contacts 10, 12, and 14 through the lines 20, 22 and 24.

Arranged to engage the contacts already mentioned are movable contacts of a group 42 which may be located inside a female element arranged to slip over the member carrying the fixed contacts. The movable contacts of this group are indicated at 44, 46, 48, 50, 52, 54 and 56. These are shown in their final engaging positions, but as connection is made these movable contacts wipe over the fixed contacts in a direction which would appear downwardly in the drawing, i.e., the contact 56 will first wipe over the contact 30 and then proceed to wipe over the contacts in succession, finally arriving in engagement with contact 40. The other movable contacts will likewise wipe the fixed contacts in sucession to arrive at the final positions ilustrated. In final position both contacts 44 and 46 engage contact 30.

A box 42 carried by the meter reader may either carry directly the plug containing the movable contacts of the group 42 or may have its elements connected to these through a cable. The box 42 contains the power supply indicated as a battery 58 which may be single small cell such as a so-called mercury cell for a nominal voltage of about 1.5 volts. The negative terminal of the battery 58 is connected through line 60 of the movable contact 44. The positive terminal of the battery is connected through 62 and the resistors 64 and 66 through

3 line 68 to the contact 48. Diodes 70 and 72 provide connections from the resistance array to a line 74 connected to contact 46. The arrangement of the resistors 64 and 68 and the diodes 70 and 72 provides an accurately maintained potential between the contacts 46 and 48, for example of about 1 volt if silicon diodes are used, and this fixed voltage, when operation occurs, is applied across the potentiometers.

The line 74 is connected through an adjustable resistance 76 and a meter 82 to the movable contact 50, while similar connections are provided to the movable contacts 52 and 54 through the variable resistance 78 and meter 84 and through the variable resistance 80 and meter 86. The variable resistances indicated may be networks having provisions for fine adjustment to provide proper readings on the meters corresponding to the positions of the potentiometer contacts.

To the extent so far described, the elements and their connections are conventional, and assuming that the plug and socket have been assembled for reading it will be evident that the meters will read the potentials of the potentiometer contacts and hence the positions of the meter spindles. If the contact resistances are low compared with the other resistances in the circuit, accurate readings are obtainable particularly in view of the diode-regulated potential across the potentiometers. The time involved in each reading is small, and with resistances of relatively large values battery drain is small and a single cell will be sufficient for a large number of readings.

As stated previously, capacitor discharge has been used to effect cleaning of the contacts, capacitors having been used charged to potentials upwardly of, for example 6 volts. The conventional arrangement need not be described since it will be inherently evident from a description of the preferred embodiment of the invention which not only provides the contact-cleaning voltage but also involves what is herein novel in the achievement of charging only when required.

Within the box 42 there is the capacitor 88 which may have a wide variation of values but which may be typically of the order of 10 microfarads, there being no necessity for higher capacitance values. A connection 90 joins the positive terminal of the capacitor to the contact 54. Its negative terminal is connected through 92 to the contact 56. The capacitor is shunted by the series arrangement of resistors 94 and 96 which may for satisfactory operation have resistances of the order of upwards of a half megohm each, the values being chosen to suit the capacitor voltage desired and the characteristics of the field effect transistor used. Charging is effected through a transformer 98 the secondary 100 of which provides a charging output through a rectifier 102 to the capacitor. The split primary 104 has its indicated upper terminal connected through a capacitor 106 to the base of a transistor 108, the emitter of which is connected to the center tap of the transformer primary winding. The illustrated lower end of the primary winding is connected at 112 to the negative terminal of the battery 58. The collector is connected at 114 to the positive battery terminal. The drain terminal of the N-channel type field effect transistor 116 is connected at 118 through the connection 114 to the positive battery terminal. The source terminal is connected through the protective resistor 120 to the base of transistor 108. The gate of the field effect transistor 116 is connected at 122 through a protective high resistance 124 to the junction of the resistors 94 and 96.

The field effect transistor is of the N-channel type which means that if the gate potential is positive or only negative to a limited extent relative to its source substantial current may flow therethrough so that current flow will occur through the base of transistor 108 to render this transistor conductive and therefore in its oscillator circuit capable of producing oscillations which

4 through the transformer secondary and rectifier 102 will charge the capacitor. However, when the capacitor charges to a sufficient extent, the gate of transistor 116 will become sufficiently negative to pinch off the current flowing from the source to the base of transistor 108, with the result that the collector-emitter circuit of transistor 108 will become effectively non-conductive (with only very minor leakage) and the oscillations will cease. Oscillations will only be renewed when the capacitor discharges to an extent again permitting conductivity of the transistor 116. Using high resistances at 94 and 96 means that, once charged, the capacitor will discharge only slowly, under its inactive conditions, so that charging will occur only at considerable intervals and then for only brief periods of time.

From the standpoint of cleaning the contacts as the plug and socket assembly is made, the wiping of the contacts of the group 42 downwardly through engagements with the contacts of the group 26 will produce current flow under the relatively high voltage, i.e., exceeding the battery voltage, of the capacitor 88. Ordinarily the plug and socket engagement is effected very quickly so that if successive pairs of contacts are made only partial discharges of the capacitor 88 take place. The first such contact configuration will involve engagement of contacts 54 and 56 with 30 and 32, respectively. Under this condition current flow will be through the relatively high resistances of the potentiometers in parallel. The next array produced will be that of contacts 54 and 56 respectively with the contacts 32 and 34, whereupon the conductive path is through the lower portion of potentiometer 4 and its movable contact. As the successive other pairs of contacts are engaged by contacts 54 and 56, current flow paths are produced through obvious resistances of the potentiometers. Under the elevated voltage, currents are effective for cleaning, and thus contact resistances are reduced to negligible values. In the final position the contact 56 is opened, engaging only the unconnected fixed contact 40. While the oscillator will operate to recharge the capacitor 88 at this time, and disconnection of the plug and socket will again produce current flows discharging the capacitor, this action is not of interest. When disconnection is complete, the capacitor 88 will be quickly recharged, ready for another operation.

It will be evident from the foregoing that preservation of the life of the battery 58 is effected due to the fact that substantial current drain therefrom occurs only for very short periods at widely spaced intervals even though the capacitor is practically at all times in condition to effect the contact-cleaning operations.

It will be evident that the arrangement described for minimizing battery drain may be used for charging capacitors for numerous other purposes, and is applicable to the charging of capacitors even to very high voltages, there being only necessary a suitable choice of the relative values of resistors 94 and 96 to suit the charging voltage desired and for characteristics of the field effect transistor. While, of course, charging times may be extended, the arrangement may effect charging of very large capacitors, the discharges from which may serve various purposes.

What is claimed is:

1. In combination, a capacitor, a low voltage supply, and means for charging the capacitor to a potential exceeding that of the supply, the last means comprising an oscillator including a transformer and rectifying means connected to supply a direct current output from the oscillator to the capacitor, a field effect transistor having its drain-source circuit connected to control operation of the oscillator, and a high resistance network across the capacitor connected to the gate of the field effect transistor to control its source-drain current, the last connections being arranged so that, when the capacitor attains a predetermined charge, the source-drain current of the field effect transistor is cut off and the oscillator is rendered inactive by cutoff of its supply current, thereby producing a minimal drain on the supply.

2. The combination of claim 1 in which the active element of the oscillator is a transistor having a base control connection and in which the drain-source circuit of the field effect transistor is connected to control base current of the oscillator transistor.

3. A portable utility meter reading device of the type having at least one electrical meter, a supply battery, and a multiple terminal connector adapted to be connected to another multiple terminal connector associated with at least one variable electrical element movable in correspondence to measurements by a utility meter, said meter reading device comprising a capacitor, means for charging the capacitor to a potential exceeding that of the supply battery, the last means comprising an oscillator including a transformer and rectifying means connected to supply a direct current output from the oscillator to the capacitor, a field effect transistor having its drain-source circuit connected to control current flow from said supply battery to control operation of the oscillator, and a high resistance network across the capacitor connected to the gate of the field effect transistor to control its source-drain current, the last connections being arranged so that, when the capacitor attains a predetermined charge, the source-drain current of the field effect transistor is cut off and the oscillator is rendered inactive by cutoff of its supply current, thereby producing a minimal drain on the supply battery, and connection between the capacitor and the terminals of the first mentioned connector effective to discharge the capacitor when that connector is joined to a connector of the second mentioned type, thereby to effect cleaning of the terminals.

4. The combination of claim 3 in which the active element of the oscillator is a transistor having a base control connection and in which the drain-source circuit of the field effect transistor is connected to control base current of the oscillator transistor.

5. The combination of claim 3 in which said multiple terminal connectors are of cooperating types in which successive engagements of the terminals occur when connection is being made.

References Cited

UNITED STATES PATENTS

| | | | |
|---|---|---|---|
| 3,054,095 | 9/1962 | Heller | 340—188X |
| 3,130,378 | 4/1964 | Cook, Jr. | 307—251X |
| 3,316,445 | 4/1967 | Ahrons | 321—2X |
| 3,324,438 | 6/1967 | Wapner | 340—188X |
| 3,407,311 | 10/1968 | Hansen | 307—137 |

OTHER REFERENCES

William Gosling: Field Effect Transistor Applications, John Wiley & Sons, 1965, pp. 111–119.

ALFRED E. SMITH, Primary Examiner

U.S. Cl. X.R.

307—246, 251; 320—1